US012716492B2

(12) United States Patent
Uehara et al.

(10) Patent No.: US 12,716,492 B2
(45) Date of Patent: Aug. 25, 2026

(54) BONDING STRUCTURE, METAL GASKET OR METAL O-RING USED THEREIN, AND CONTAINER, PIPE, AND ORGANOTIN COMPOUND MANUFACTURING APPARATUS HAVING THE SAME

(71) Applicants: Mitsubishi Chemical Corporation, Tokyo (JP); GELEST, Inc., Morrisville, PA (US)

(72) Inventors: Hisatoshi Uehara, Tokyo (JP); Hiroshi Fukui, Tokyo (JP)

(73) Assignees: MITSUBISHI CHEMICAL CORPORATION, Tokyo (JP); GELEST, INC., Morrisville, PA (US)

( * ) Notice: Subject to any disclaimer, the term of this patent is extended or adjusted under 35 U.S.C. 154(b) by 55 days.

(21) Appl. No.: 18/409,858

(22) Filed: Jan. 11, 2024

(65) Prior Publication Data

US 2024/0280176 A1 Aug. 22, 2024

Related U.S. Application Data

(60) Provisional application No. 63/444,750, filed on Feb. 10, 2023.

(51) Int. Cl.
*F16J 15/08* (2006.01)

(52) U.S. Cl.
CPC ....... *F16J 15/0806* (2013.01); *F16J 15/0893* (2013.01)

(58) Field of Classification Search
CPC ....... F16J 15/06; F16J 15/0806; F16J 15/0893
See application file for complete search history.

(56) References Cited

FOREIGN PATENT DOCUMENTS

| | | | |
|---|---|---|---|
| JP | 2624941 B2 | 6/1997 | |
| JP | 2003-172452 A | 6/2003 | |
| WO | WO-2011152332 A1 * | 12/2011 | ................ B01J 3/03 |

OTHER PUBLICATIONS

Machine Translation of WO2011152332 (Year: 2025).*

* cited by examiner

*Primary Examiner* — Gilbert Y Lee
(74) *Attorney, Agent, or Firm* — Panitch Schwarze Belisario & Nadel LLP

(57) ABSTRACT

A bonding structure used for forming a sealed space (for example, a container) for containing or transferring an organotin compound, wherein the bonding structure is a structure in which a first metal member (for example, a lid of the container) is connected to a second metal member (for example, a container body of the container) via a metal gasket or a metal O-ring, and the metal gasket or the metal O-ring has a surface having a Vickers hardness set to be not less than lower than a Vickers hardness of a surface of a portion of the metal member, the portion being contacted with the metal gasket or the metal O-ring.

17 Claims, 2 Drawing Sheets

1: LID
2: CONTAINER BODY
6: GASKET

[FIG. 1]
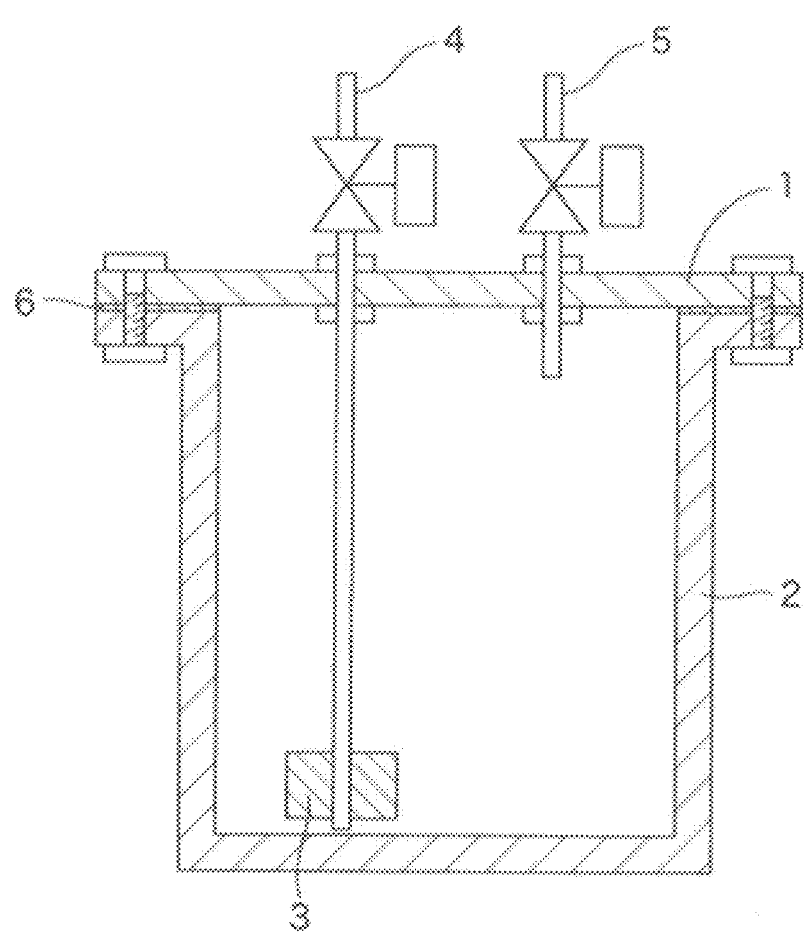
1: LID
2: CONTAINER BODY
6: GASKET

[FIG. 2]
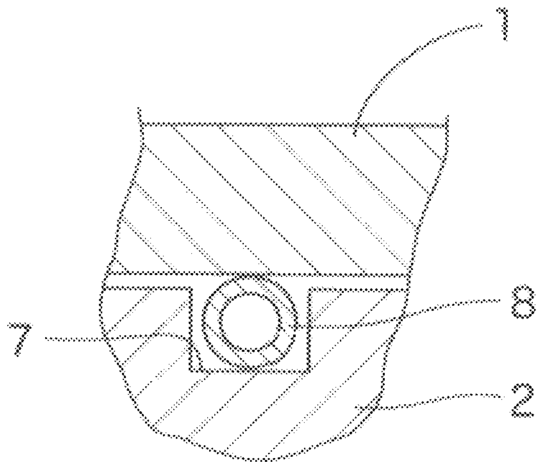

BONDING STRUCTURE, METAL GASKET OR METAL O-RING USED THEREIN, AND CONTAINER, PIPE, AND ORGANOTIN COMPOUND MANUFACTURING APPARATUS HAVING THE SAME

CROSS REFERENCE TO RELATED APPLICATIONS

The present application claims the benefits of priority to U.S. provisional application No. 63/444,750, filed on Feb. 10, 2023, the entire disclosure of which is incorporated herein by reference.

TECHNICAL FIELD

The present disclosure relates to: a bonding structure used for a container, a pipe, etc. for containing or transferring a highly pure organotin compound in semiconductor manufacturing, a CVD treatment process, etc.; and a metal gasket or a metal O-ring used therein. The present disclosure also relates to a container, a pipe, and an organotin compound manufacturing apparatus having the bonding structure.

BACKGROUND ART

In recent years, various materials have been used in precision manufacturing processes of information electronic materials, semiconductors, etc. These materials are desired to have an ultrahigh purity in many cases, and prevention of decrease in purity and contamination of an impurity is strongly demanded in not only manufacturing stage but also storage, transportation, and use of the materials.

Manufacturing equipment, a container, a pipe, etc. handling such materials required to have an ultrahigh purity have various bonding structures in order to keep the inside to be a clean sealed space.

For the bonding structure, a gasket or an O-ring is commonly used between members to be bonded in order to improve sealability of the bonding part. To prevent adverse effects on the inside due to corrosion or deterioration of the part itself, a part made of metal such as stainless steel, not a resin or an elastomer, is widely used (for example, following PTL 1 and 2, etc.)

RELATED ART DOCUMENT

Patent Document

PTL 1: JP-B-2624941
PTL 2: JP-A-2003-172452

SUMMARY OF DISCLOSURE

Problem to be Solved by the Disclosure

The metal gasket or O-ring has excellent corrosion resistance and heat resistance, but may cause plastic deformation or scratches during interposing and fastening between a metal member and a metal member, and repeatedly use may deteriorate the adhesiveness. In addition, there is another problem of requirement of minute attention in attaching and detaching operations.

Particularly, there has been increased demands for further higher quality of ultraprecise electronic components represented by semiconductor devices in recent years, and demands on purity management of used reagents, etc. have become furthermore strict. Accordingly, various investigations on materials and attaching structure of such a gasket or O-ring are in progress.

In view of such circumstances, use of an organotin compound as a precursor material in semiconductor manufacturing and CVD treatment process has been recently proposed and attracted attention.

The organotin compound is a kind of organometallic compounds, and the valency can change to a different valency with oxidation and reduction. An organic group bonded to tin is rearranged into a same or different metal species via transmetalation. Although elution of metal is concerned in this process, a metal content as an impurity is required to be an ultralow level. Furthermore, when the organotin compound has a hydrolysable group, the organotin compound is easily reacted with water to be decomposed, resulting in decrease in purity. Thus, strict airtightness is required, and corrosion and contamination of foreign matters are also needed to be strictly prevented.

Accordingly, required is a bonding structure that has no such a risk and that can provide a container and a pipe suitable for containing and transferring the organotin compound.

The present disclosure has been made in view of such circumstances. An aspect of the present disclosure is to provide a bonding structure suitable for containing and transferring the organotin compound, which requires strict airtightness.

Means for Solving the Problems

In view of the above circumstances, the present inventors have found that, in a structure of connecting metal members using a metal gasket or a metal O-ring, an excellent effect is obtained by providing a specific relationship between hardness of surfaces of the portions contacted with each other. This finding has led to the present disclosure.

Specifically, the present disclosure has the following aspects.

[i] A bonding structure used for forming a sealed space for containing or transferring an organotin compound, wherein the bonding structure is a structure in which a first metal member is connected to a second metal member via a metal gasket or a metal O-ring, and the metal gasket or the metal O-ring has a surface having a Vickers hardness set to be not less than 10 and not more than 120 lower than a Vickers hardness of a surface of a portion of the metal member, the portion being contacted with the metal gasket or the metal O-ring.

[ii] The bonding structure according to [i], wherein the organotin compound is represented by the following general formula (1),

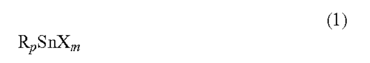

$$R_pSnX_m \quad (1)$$

wherein R represents a hydrocarbon group; "p" represents 0 or 1; X represents a hydrolysable substituent; "m" represents an integer of 1 to 4; and m+p represents 2 or 4.

[iii] The bonding structure according to [i] or [ii], wherein the organotin compound has a purity of not less than 99%.

[iv] The bonding structure according to any of [i] to [iii], wherein when the first metal member in the bonding structure is a lid, the Vickers hardness of the surface of the metal gasket or the metal O-ring is set to be not less than 50 and not more than 100 lower than the Vickers hardness of the surface of the portion of the metal member, the portion being contacted with the metal gasket or the metal O-ring.

[v] The bonding structure according to any of [i] to [iii], wherein when the first metal member in the bonding structure is a pipe for transfer, the Vickers hardness of the surface of the metal gasket or the metal O-ring is set to be not less than 10 and not more than 100 lower than the Vickers hardness of the surface of the portion of the metal member, the portion being contacted with the metal gasket or the metal O-ring.

[vi] The bonding structure according to any of [i] to [v], wherein the metal gasket or the metal O-ring is formed with stainless steel or a nickel alloy containing not less than 50 mass % of nickel.

[vii] The bonding structure according to any of [i] to [v], wherein the metal gasket or the metal O-ring is formed with SUS 316L.

[viii] The bonding structure according to any of [i] to [v], wherein the metal gasket or the metal O-ring is formed with a nickel alloy containing nickel at not less than 50 mass %, iron, and chromium.

[ix] The bonding structure according to any of [i] to [viii], wherein in the portion of the metal member, the portion being contacted with the metal gasket or the metal O-ring, a surface layer within a predetermined depth has a higher hardness than an inner layer that is deeper than the surface layer by a surface-hardening treatment.

[x] The bonding structure according to any of [i] to [ix], wherein all of the first metal member, the metal gasket or the metal O-ring, and the second metal member are formed by using a same metal material.

[xi] The bonding structure according to any of [i] to [x], wherein the metal gasket or the metal O-ring is an O-ring in which an inside is filled with an inert gas.

[xii] The bonding structure according to any of [ii] to [xi], wherein the organotin compound is represented by the following general formula (1),

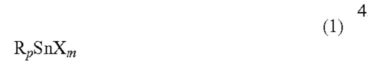

$$R_pSnX_m \quad (1)$$

wherein "p" represents 1; and "m" represents 3.

[xiii] The bonding structure according to any of [i] to [xii], wherein the organotin compound has a purity of not less than 99.9%.

[xiv] A metal gasket or a metal O-ring used for the bonding structure according to any of [i] to [xiii].

[xv] A container, comprising the bonding structure according to any of [i] to [xiii].

[xvi] A pipe for transferring an organotin compound, the pipe comprising the bonding structure according to any of [i] to [xiii].

[xvii] An organotin compound manufacturing apparatus, comprising a pipe or a container comprising the bonding structure according to any of [i] to [xiii].

Effects of the Disclosure

According to the bonding structure of the present disclosure, in the structure connecting the metal members by using the metal gasket or the metal O-ring, the hardness of the surface of the portion where the members are contacted with each other is set to have the specific relationship, and thereby adhesiveness to each other on the bonding surfaces is significantly high, and the organotin compound can be kept to have an ultrahigh purity in containing and transferring the organotin compound.

According to the container, the pipe for an organotin compound, and the organotin compound manufacturing apparatus having the above bonding structure, the organotin compound can be handled in a safe and stable state without deteriorating quality of the handled organotin compound.

BRIEF DESCRIPTION OF DRAWINGS

FIG. 1 is a schematic explanatory view of a bonding structure including a container and a gasket in Example of the present disclosure.

FIG. 2 is a schematic explanatory view of a bonding structure including a container and an O-ring in Example of the present disclosure.

EMBODIMENTS OF THE DISCLOSURE

Hereinafter, the present disclosure will be described in detail based on embodiments of the present disclosure, but the present disclosure is not limited to the following embodiments.

An expression of "Y to Z" (Y and Z represent given numbers) herein encompasses "not less than Y and not more than Z," and "preferably not less than Y" or "preferably not more than Z" unless otherwise mentioned.

An expression of "not less than Y" (Y represents a given number) or "not more than Z" (Z represents a given number) also encompasses "more than Y is preferable" or "less than Z is preferable."

An embodiment of the present disclosure is a bonding structure used for forming a sealed space for containing or transferring an organotin compound.

A container of another embodiment of the present disclosure is a container comprising the above bonding structure. The container is used for containing, transferring, or transporting a highly pure organotin compound in semiconductor manufacturing, CVD film-forming process, etc. In a case of transferring, the container includes, for example, a bubbler, which is a temporary storage container for feeding a liquid to CVD.

A pipe of another embodiment of the present disclosure is a pipe including the above bonding structure. The pipe includes: a pipe used for transferring a handled organotin compound, for example, a pipe used for feeding pipe from a top face of a container to CVD, etc.; a pipe for inserting a raw material in manufacturing; and a pipe for feeding a liquid into a container after manufacturing.

A manufacturing apparatus of another embodiment of the present disclosure is an apparatus for manufacturing an organotin compound. The apparatus has the container or pipe comprising the above bonding structure, and refers to both of a synthesis instrument used for trial manufacturing conducted in a small scale, and an apparatus used as an actual apparatus, which is larger than the instrument.

The organotin compounds are easily reacted with water or air to exhibit flammability at a normal temperature in many cases, and a liquid reagent for CVD precursor requiring 99.9% purity (in terms of tin) is also included in the compounds. The organotin compound requires strict airtightness. The organotin compound also requires strict elimination of corrosion and contamination.

Particularly, the organotin compound with a high purity is typically liquid, and it is an important challenge to keep the high purity in a container or a transferring line for containing or transferring the organotin compound.

Note that when the organotin compound is used as a raw material for semiconductor manufacturing, an impurity content is required to be as low as possible. Specifically, a content of metal other than tin is typically not more than 10 ppb, preferably not more than 2 ppb, and more preferably not more than 1 ppb.

If the metal is remained in semiconductor manufacturing, process error occurs particularly in an etching step, and the yield may considerably decrease due to high definition of lithography in recent years. In addition, errors such as operation failure may occur due to unexpected insulation or conduction. From these reasons, the content of the metal other than tin is required to be significantly reduced.

The metal refers to a component containing a metal element. Specific examples thereof include: metal single substances, such as iron, nickel, cobalt, copper, zinc, aluminum, manganese, magnesium, sodium, calcium, potassium, and lead; salts of these metals, such as halide, hydroxide, sulfate salt, nitride salt, and carbonate salt; and compounds having at least one organic group (organometallic compound). In recent years, not less than 20 elements are managed in some cases depending on a reagent. Among these, lead easily causes the error, and thereby particularly required to be reduced.

Due to having at least one hydrolysable group, the organotin compound is easily hydrolyzed. When a hydrolyzed product of the organotin compound (hydrolyzed tin) increases to a certain degree, the hydrolyzed tin forms a network with Sn—O—Sn bonds to change physical properties of the liquid, and thereby a content of such a hydrolyzed product is preferably as low as possible. That is, the content of the hydrolyzed tin is typically not more than 1%, preferably not more than 0.1%, and further preferably not more than 500 ppm.

In addition, halogen single substances, hydrogen halides, and halides to be a source of these halogens may decompose the organotin compound, and thereby the content of these halogen is also preferably as low as possible. That is, a content of halogen atoms is typically not more than 30 ppm, preferably not more than 10 ppm, and more preferably not more than 1 ppm. Examples of the halogen atom typically include fluorine, chlorine, bromine, and iodine, and particularly, chlorine and bromine are used in a step of manufacturing the organotin compound in some cases. Thus, the content is needed to be reduced.

When a plurality of types of the organotin compound is mixed, a purity as a total of each of the organotin compounds is desirably not less than 99.9%. That is, a content of compounds other than the organotin compound (inorganic tin compound) and tin single substance is desirably less than 0.1%.

When the organotin compound is specified as the compound represented by the general formula (1), a content of an organotin compound represented by other than the general formula (1), as the impurity, is typically not more than 5%, preferably not more than 2%, and further preferably not more than 1%.

Specifically, a compound represented by the following general formula (2) may cause a problem in semiconductor manufacturing, and thereby a content thereof is preferably not more than 0.5%, and further preferably not more than 0.2%.

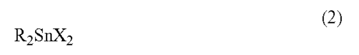

$R_2SnX_2$ (2)

R represents a hydrocarbon group, and X represents a hydrolysable substituent.

In the present disclosure, the purity of the above organotin compound (in terms of tin) can be measured by using NMR (JNM-ECZ400, available from JEOL, Ltd.)

The metal other than tin can be quantified by using ICP-MS (high-frequency emission mass spectrometer, Agilent 7700, available from Agilent Technologies Japan, Ltd.)

The halogen can be quantified by using combustion-absorption ion chromatography (combustion system: AQF-2100H, available from Nittoseiko Analytech Co., Ltd. & ion chromatography system: ICS5000+, available from Thermo Fisher Scientific K.K.) The organotin compound is a compound in which an organic group is directly bonded to a tin atom, and any number of groups other than the organic group may or may not be substituted. The organotin compound may be a compound having a tin-tin bond, or may be a compound having a plurality of tin atoms via the organic group or another group. Among these organotin compounds, an organotin compound represented by the following general formula (1) is preferably used.

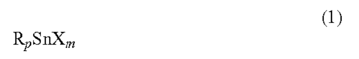

$R_pSnX_m$ (1)

In the formula, "R" represents a hydrocarbon group, and represents a hydrocarbon group having preferably 1 to 30 carbon atoms, more preferably 1 to 15 carbon atoms, more preferably 1 to 10 carbon atoms, and further preferably 2 to 6 carbon atoms. Examples of the hydrocarbon group include: saturated hydrocarbon groups, such as methyl group, ethyl group, n-propyl group, isopropyl group, n-butyl group, isobutyl group, t-butyl group, and 1-methylcyclopentyl group; and unsaturated hydrocarbon groups, such as vinyl group and 2-propenyl group.

In the formula, "X" represents a hydrolysable substituent. Examples of the hydrolysable substituent include halogen, amino group, alkoxy group (—OR'), alkynide (R'C≡C), azide ($N_3$—), dialkylamino group (—NR'$_2$) and (—NR'R"), alkylcarbonylamino group (—N(R')C(O)R'), (—N(R')C(O)R"), and (—N(R")C(O)R'), carbonyloxy group (—OCOR'), and carbonylamino group (—N(H)C(O)R'). R' and R" each independently represent a hydrocarbon group having 1 to 10 carbon atoms. Among these, X preferably represents dialkylamino group, alkoxy group, alkylcarbonylamino group, halogen, or carbonyloxy group, X particularly preferably represents dialkylamino group or alkoxy group, and furthermore preferably dialkylamino group (—NR'2) or alkoxy group (—OR').

In the formula, "p" represents 0 or 1, and "m" represents an integer of 1 to 4. Since the tin atom is typically divalent or tetravalent, p+m typically represents 2 or 4. In the present disclosure, p+m preferably represents 4, which indicates chemically more stable tetravalent. When the organotin compound is used as a precursor of a resist for a semiconductor, having a plurality of the hydrolysable substituents enables efficient film formation, and thereby "p" preferably represents 1 and "m" preferably represent 3.

The organotin compound has a molecular weight of typically 200 to 900, preferably 240 to 700, and particularly preferably 280 to 500.

In the present embodiment, among the above organotin compound materials, use of an organotin compound represented by the following general formula (3) is particularly preferable in terms of the effect. "R" in the following formula represents a hydrocarbon group, similarly to "R" in the general formula (1), and among these, "R" preferably represents a hydrocarbon group having 1 to 15 carbon atoms, more preferably 1 to 10 carbon atoms, and further preferably having a beta-hydrogen and 2 to 6 carbon atoms. X in the following formula is same as "X" in the general formula, and preferably represents dialkylamino group, alkoxy group, alkylcarbonylamino group, halogen, or carbonyloxy group, X particularly preferably represents dialkylamino group and alkoxy group, and furthermore preferably dialkylamino group (—NR'2) or alkoxy group (—OR').

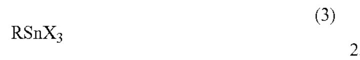

$$RSnX_3 \quad (3)$$

R represents a hydrocarbon group having 1 to 30 carbon atoms, and X represents a hydrolysable substituent.

Examples of such an organotin compound include t-butyltris(dimethylamino)tin, n-butyltris(dimethylamino)tin, t-butyltris(diethylamino)tin, sec-butyltris(dimethylamino)tin, n-pentyltris(dimethylamino)tin, isobutyltris(dimethylamino)tin, isopropyltris(dimethylamino)tin, isopropyltri-t-butoxytin, t-butyltri-t-butoxytin, n-butyltri-t-butoxytin, isopropyltri-t-butoxytin, tetrakis(dimethylamino)tin, and tetra-t-butoxytin.

When more than one organotin compounds are mixed, a component with the largest content satisfies the above requirement. Since more components satisfying the requirement enable more efficient film formation, not less than 50% in weight of the organotin compound preferably satisfies the above requirement, not less than 80% in weight of the organotin compound more preferably satisfies the above requirement, not less than 90% in weight of the organotin compound further preferably satisfies the above requirement, and not less than 95% in weight of the organotin compound particularly preferably satisfies the above requirement.

The organotin compound, which is a target to be applied of the bonding structure of the present embodiment, may be a single compound, or may be a mixture of a plurality of types. When two or more types of the organotin compound are mixed, a difference in molecular weights of two types having the largest difference in the molecular weight is preferably not more than 100 because the two types of the compound can be simultaneously evaporated in a film-forming step with CVD. The difference is more preferably not more than 50, further preferably not more than 30, and particularly preferably not more than 15. An isomeric mixture having the same molecular weight is also preferable for the same reason.

The above organotin compound may be diluted with a solvent independently on the purity of the organotin compound. Specific examples of the solvent include: aromatic hydrocarbons, such as toluene, xylene, benzene, and anisole; aliphatic hydrocarbons, such as hexane, heptane, and octane; saturated cyclic hydrocarbons, such as cyclohexane and methylcyclohexane; esters, such as ethyl acetate, butyl acetate, butyl propionate, and propylene glycol monomethyl ether acetate; ethers, such as diethyl ether, diisopropyl ether, methyl t-butyl ether, cyclopentyl methyl ether, tetrahydrofuran, and 1,4-dioxane; alcohols, such as methanol, ethanol, 1-propanol, isopropanol, 1-butanol, t-butanol, 4-methyl-2-propanol, ethylene glycol, and propylene glycol; ketones, such as methyl ethyl ketone, methyl isobutyl ketone, and cyclohexanone; and amides, such as dimethylformamide, dimethylacetamide, and N-methylpyrrolidone. The solvent is not limited thereto, but among these, esters, ethers, ketones, and amides, which are aprotic highly polar solvents, are preferable because such solvents dissolve components during the hydrolysis at a certain degree. Ethers and amides, which have a high coordinating property, are more preferable, and amides are particularly preferable. Alcohols, which are protic highly polar solvents, are preferable because such solvents can promote the hydrolysis while exchanging the hydrolysable substituent represented by X and keeping the solubility, and t-butanol and 4-methyl-2-propanol are more preferable.

A degree of the dilution is appropriately regulated depending on the use form, and when the organotin compound is used in a spin-coater process for forming a resist film, for example, the organotin compound as a base is diluted typically within a range of 0.005 to 1.4 M (mol/L), preferably within a range of 0.02 to 1.0 M (mol/L), and more preferably 0.05 to 0.5 M (mol/L).

Next, the bonding structure in the present embodiment (hereinafter, also referred to as "the present bonding structure") will be described.

The present bonding structure is a bonding structure used for forming a sealed space (a container, a pipe, etc.) for containing or transferring the above organotin compound. The present bonding structure is a structure connecting a first metal member and a second metal member via a metal gasket or a metal O-ring.

A Vickers hardness of a surface of the metal gasket or the metal O-ring is set to be not less than 10 and not more than 120 lower than a Vickers hardness of a surface of a portion of the first and second metal members, the portion being contacted with the metal gasket or the metal O-ring.

That is, all the constituent members of the first member and the second member used for the present bonding structure, and the gasket or O-ring interposed therebetween to connect these members are made of metal. The present bonding structure has a feature that, as for a portion where these members are contacted with each other, the Vickers hardness of the surface of the metal gasket or the metal O-ring interposed between the two metal members is lower than the Vickers hardness of the two metal members, which are the bonding targets, by within a range of not less than 10 and not more than 120, namely softer.

Examples of the aforementioned first and second metal members include combination of: a container body and a lid of a container for containing the organotin compound; a lid and a level sensor connected to the lid; a lid and an organotin-compound-injecting pipe attached to the lid; and a lid and an organotin-compound-extracting pipe attached to the lid. Examples of the combination also include various combinations of: a pipe used for transferring the organotin compound and a pipe; and a pipe and a joint structure connected to another apparatus.

The bonding structure of a container and a lid or the bonding structure of a lid and a level sensor has high frequency of opening and closing, and thereby setting the Vickers hardness of the metal gasket or the O-ring to be not less than 50 lower than the Vickers hardness of the other member yields an appropriate fastening torque to connect members such as bolts and a ferule, and a number of bolts can be reduced, for example. The setting is also preferable because the ferule itself is not deformed to prevent liquid leakage.

Meanwhile, the pipe joint to a CVD apparatus for liquid-transferring the organotin compound, for example, hardly causes opening and closing of the bonding structure, and thereby there is no problem when the hardness of the metal gasket is set to be not less than 10 lower than the hardness of the flanges of the first and second metal pipes and when the bonding structure part is strongly fixed once by increasing a fastening torque for forming the bonding structure part, etc. However, once opening the bonding structure part may cause deformation, etc., and thereby such a setting is unsuitable for a case where the bonding part is frequently opened and closed.

In both of bonding the lid and bonding the pipe, the Vickers hardness of the metal gasket or the O-ring is preferably set not more than 120, more preferably not more than 100, and further preferably not more than 50, lower than the Vickers hardness of the first and second members to be the counter bonded member.

Examples of the metal to be the material of the metal member typically include stainless steel, nickel alloy containing not less than 50 mass % of nickel, and nickel that have excellent corrosion resistance. Among the stainless steel, austenitic stainless steel is particularly preferable because the hardness is easily increased by a nitriding treatment, a roller-burnishing process, etc., as described later. Examples of such austenitic stainless steel include SUS 304, SUS 316L, and SUS 321, and SUS 316L is particularly preferable.

The representation of the austenitic stainless steel is in accordance with JIS, and ASTM standard corresponding thereto and each composition are as shown in the following Table 1.

minum, for example) may be reacted with the organotin compound to elute the metal, or may be excessively deformed due to fastening during the bonding to deteriorate sealability, as described later. Thus, it is preferable that the metal material same as the material of the metal members is used as the metal gasket, etc., and meanwhile, the surface portion of the metal member to be the counter member, at least the surface portion to be contacted with the metal gasket, etc., is subjected to a nitriding treatment, a roller-burnishing process, etc. for increasing a hardness of the portion to set the Vickers hardness to be not less than 50 higher than the Vickers hardness of the metal gasket, etc., for example.

Meanwhile, in bonding each of the metal pipes involved with transferring the organotin compound, gently performing these treatment and process can achieve the Vickers hardness not less than 10 higher than the Vickers hardness of the metal gasket, etc., but a gasket, etc. originally having a hardness difference may be selected.

A hardness of the austenitic stainless steel can be easily changed by annealing, a rolling treatment, etc. For example, a hardness of SUS 316L can be easily changed according to conditions of a rolling-process treatment.

Steel materials having a hardness of appropriately 200 HV are commonly distributed, and the hardness may be changed to 130 to 170 HV by an annealing treatment.

The surface-hardening treatment such as the nitriding treatment and the roller-burnishing process may be effectively applied for the austenitic stainless steel. Specific treatment conditions thereof may be appropriately set depending on the composition of the stainless steel and a degree of the required hardening.

Here, the metal gasket is required to have performance such as elasticity, heat resistance, pressure resistance, corrosion resistance, and long-term stability. In terms of the elasticity, it is required that the metal gasket sufficiently fits with the contacting surface of the counter member at a predetermined fastening pressure, that is, the metal gasket

TABLE 1

| | Composition (%) | | | | | | | | | | |
|---|---|---|---|---|---|---|---|---|---|---|---|
| JIS/ASTM | C | Si | Mn | P | S | Ni | Cr | Mo | Cu | N | others |
| SUS 304 / A276 304 | ≤0.08 | ≤1.00 | ≤2.00 | ≤0.045 | ≤0.030 | 8.00-10.00 | 18.00-20.00 | — | — | — | — |
| SUS 316L / A276 316L | ≤0.08 | ≤1.00 | ≤2.00 | ≤0.045 | ≤0.030 | 10.00-14.00 | 16.00-18.00 | — | — | — | — |
| SUS 321 / A276 321 | ≤0.08 | ≤1.00 | ≤2.00 | ≤0.045 | ≤0.030 | 9.00-13.00 | 17.00-19.00 | — | — | — | not less than 5 × C % of Ti |

The nickel alloy and nickel are preferably nickel alloy containing nickel at not less than 50 mass %, iron, and chromium. Examples of such nickel alloy include Inconel (R) 600 (available from SPECIAL METALS CORPORATION) as a commercial product.

As for the metal members using these metals, a surface of a portion contacted with the metal gasket or the metal O-ring interposed therebetween essentially has a Vickers hardness of not less than 10 higher than a Vickers hardness of the metal gasket, etc. in order to achieve the sealing. Particularly, when the metal members are subjected to bonding-sealing with a container lid, the surface is preferably hard and preferably has a Vickers hardness of not less than 50 higher than the Vickers hardness of the metal gasket, etc. However, use of a metal material of the metal gasket, etc. having a relatively low hardness (such as copper and aluhas sufficient strength not to break together in a state where the contacting surface is embedded with the gasket.

The metal gasket is a gasket made of only a metal material, and commonly used under high temperature and high pressure conditions utilizing strength and heat resistance of the metal. The metal gasket is used as an apparatus-bonding part of a pipe flange, a boiler, a tower, a vessel, a heat exchanger, an autoclave, CVD, etc. As for the material, stainless steel, titanium, Monel steel, etc. are commonly used in terms of the corrosion resistance, and copper, aluminum, pure iron, soft steel, etc. are commonly used in terms of a fitting property with a flange on an apparatus side. To prevent damage of the flange due to the gasket, Vickers hardness of both the members preferably have a difference of approximately 30. However, when the same type of metal is used, the hardness is same, and thereby surface processing or thermal treatment is needed. When the difference in hardness is provided by these processing and treatment, the change in the Vickers hardness is limited to approximately 50 because of properties of the metal itself. Therefore, to satisfy the requirements of the gasket, different types of soft metals are simply used to provide the difference in hardness. Since the difference in hardness from the flange surface in the joint may be selected to any hardness depending on the metal on the gasket side, the difference in the Vickers hardness may be approximately 100, for example. However, excessively large difference in hardness may cause deformation and breakage, and thereby the difference in hardness is kept up to preferably 100, and further preferably approximately 80.

The O-ring is required to be removed in the container, etc. for the organotin compound. For example, the O-ring is needed to be attached with a level sensor. For an O-ring attached with electrodes, an elastomeric resin is commonly used, but the metal O-ring is required because contacting with the organotin compound causes corrosion and swelling, and the broken O-ring causes contamination. Particularly, a metal hollow O-ring is suitable for sealing an apparatus focusing on a space factor and a lightweight property because of advantages such as ability to achieve sealability with a relatively low fastening force, ability to make a complex plane shape, usability at high temperature, high pressure, and high vacuum, etc.

The used metal to be the material of the metal gasket or the metal O-ring is required to have a Vickers hardness not less than 10 lower than a Vickers hardness of the above two metal members. However, use of a soft metal, for example, copper and aluminum, may be typically reacted with the organotin compound to elute the metal, and may be excessively deformed due to fastening during the bonding to deteriorate the sealability, as noted above. Thus, it is preferable that a metal material same as that of the above metal members is used, and the surface portion of the above metal members, at least the portion contacted with the metal gasket, etc., is subjected to the surface-hardening treatment to set the hardness of the portion to be not less than 10 higher than the Vickers hardness of the metal gasket, etc., for example.

The used metal to be the material of the metal gasket, etc., may have a Vickers hardness not less than 10 lower than the Vickers hardness of the metal member (such as a lid, for example), but preferably not less than 50 lower than the Vickers hardness. Use of a soft metal, for example, copper and aluminum, may be typically reacted with the organotin compound to elute the metal, and may be excessively deformed due to fastening during bonding to deteriorate the sealability, as noted above. Thus, among these, stainless steel, nickel alloy, nickel, etc. having excellent corrosion resistance are preferable, same as in the metal member. Among the above stainless steel, austenitic stainless steel is particularly preferable. Examples of such austenitic stainless steel include SUS 304, SUS 316L, and SUS 321, and SUS 316L is particularly preferably used.

The nickel alloy and nickel are preferably nickel alloy containing nickel at not less than 50 mass %, iron, and chromium. Examples of such nickel alloy include Inconel (R) 600 (available from SPECIAL METALS CORPORATION) as a commercial product.

As above, when the two metal members and the metal gasket, etc. interposed therebetween are all formed with the same metal material, some metal contamination into the organotin compound can be immediately judged to whether the metal is derived from the present bonding structure or not, and a route of the foreign matter contamination is easily ascertained. Thus, such a configuration is preferable.

In the present bonding structure, when the metal O-ring is interposed between the two metal members, use of a hollow O-ring filled with an inert gas (for example, nitrogen) as the metal O-ring is preferable because durability and safety, not only the corrosion resistance, are improved, and compact design can be achieved compared with a conventional resin O-ring. That is, an inside of the container for containing the organotin compound is commonly filled with an inert gas, and an inside of the pipe is also commonly purged with an inert gas, and thereby use of the metal O-ring filled with an inert gas in advance has an advantage that, even when some troubles occur to break the O-ring in the bonding structure, leakage through the damaged part is the inert gas, and thereby the organotin compound inside the container and the pipe is not adversely affected.

In the present bonding structure, the Vickers hardness of the surface of the metal gasket, etc. is needed to be set to not less than 10 lower than the Vickers hardness of the surface of the metal member contacted with the portion of the surface of the metal gasket, etc., as noted above. In terms of sealability, stability, and easiness of adjustment of the difference in hardness, a degree of the difference is preferably 30 to 150, and more preferably 40 to 100.

In the present disclosure, "Vickers hardness" is a value measured in accordance with a test method "JIS Z2244-1: 2020 Vickers Hardness Test".

Among combinations having the above difference in hardness, particularly preferable is a combination of the Vickers hardness of the surface of the metal gasket, etc. being 170 to 200, particularly 150 to 200, and the Vickers hardness of the surface of the metal member (such as the container and the pipe) being 180 to 300, particularly 180 to 280.

The bonding structure applied for the organotin compound, which is the target of the present bonding structure, typically has a premise that the metal gasket, etc. is replaced per use, and thereby a bonding structure (such as the pipe) with low replacement frequency is suitably used. Since the replacement per use has a high risk of contamination during the replacement, the present bonding structure having excellent sealability and safety is suitably applied because of the remarkable obtained effect.

According to the container, the pipe for the organotin compound, and the organotin compound manufacturing apparatus having the present bonding structure, the organotin compound can be handled in a safe and stable state without deteriorating the quality of the handled organotin compound.

EXAMPLES

Next, the embodiment of the present disclosure will be specifically described. However, the present disclosure is not limited by the following Examples at all.

<Preparation of Metal Gasket>

Prepared was a metal container for containing a reagent for semiconductor manufacturing. The metal container is schematically illustrated in FIG. 1, and composed of a lid 1 (corresponding to "the first metal member" of the present disclosure) and a container body 2 (corresponding to "the second metal member" of the present disclosure). Note that some materials had difference in shape and size of the container, but the difference was not considered. With the lid 1, members having a level sensor 3, such as a liquiddischarging pipe 4 and a liquid-injecting pipe 5, were attachable.

A metal gasket 6 to be interposed between the lid 1 and the container body 2 of this container was prepared.

Metal materials of the lid 1, the container body 2, and the gasket 6 were selected from metal materials shown in the following Table 2. In a state of constituting the container using these members (state of constituting a bonding structure), a Vickers hardness of a portion where the members are to be disposed each other is also shown in Table 2.

TABLE 2

| | Type of metal material | Presence/absence of treatment to increase hardness | Vickers hardness HV of surface to be contacted with other member |
|---|---|---|---|
| No. 1 | SUS 304L | — | 150 |
| No. 2 | SUS 316L | — | 180 |
| No. 3 | SUS 316L | Rolling process | 200 |
| No. 4 | SUS 316L | Roller-burnishing process | 230 |
| No. 5 | SUS 316L | Nitriding treatment | 290 |
| No. 6 | Nickel | — | 140 |
| No. 7 | Nickel-cobalt alloy | — | 210 |

First, the above six gaskets 6 made of different materials were immersed in tris(dimethylamino)isopropyltin for one month, and then a surface state thereof was observed as 100-time magnified image by using a microscope. As a result, it was found that all the gaskets 6 had no change on the surface, and no corrosion occurred.

In addition, a mass and a volume of the gasket 6 before the immersion were measured, and a mass after the immersion was measured to determine a change in mass per unit volume of the gasket 6 before and after the immersion. As a result, the change was all within +0.0002 g, and it was found that almost no metal was eluted.

Examples 1 to 4 and Comparative Examples 1 and 2

The gasket 6, the lid 1, and the container body 2, which use the materials described in Table 1, are assembled as shown in the following Table 3 to constitute a container (see FIG. 1). The container is incorporated into a semiconductor manufacturing line using an organotin compound [tris(dimethylamino)isopropyltin] to be used for one month. When a purity of the organotin compound decreases to less than 99.9%, a number of times of troubles such as leakage and scratches are estimated. Specifically, the container is filled with the organotin compound so that the head space is 30%. Since the container becomes empty every three days, the container is opened, and washed with an organic solvent and ultrapure water, leakage check is performed, and then the container is refilled if there is no problem of the washing. The state of the joint part is checked at every time, and if there is a problem, the gasket 6 is replaced (observation total 10 times). If the flange side is damaged or scratched, the test is terminated at this time. The results estimated by the above are also shown in the following Table 3.

TABLE 3

| | Material of lid 1 and container body 2, and hardness (Vickers hardness P) of surface thereof | Material of gasket 6 and hardness (Vickers hardness Q) of surface thereof | Difference in Vickers hardness (P-Q) | Estimated number of times of occurrence of leakage and scratch |
|---|---|---|---|---|
| Example 1 | No. 3: SUS 316L (200) | No. 1: SUS 304L (150) | 50 | 0 |
| Example 2 | No. 4: SUS 316L (230) | No. 2: SUS 316L (180) | 50 | 0 |
| Example 3 | No. 4: SUS 316L (230) | No. 6: Nickel (140) | 90 | 0 |
| Example 4 | No. 4: SUS 316L (230) | No. 7: Nickel-cobalt alloy (210) | 20 | Fastening failure |
| Comparative Example 1 | No. 3: SUS 316L (200) | No. 3: SUS 316L (200) | 0 | Terminated with scratch once |
| Comparative Example 2 | No. 5: SUS 316L (290) | No. 6: Nickel (140) | 150 | Leakage twice |

As above, all the products of Examples 1 to 3 in which the Vickers hardness of the gasket 6 interposed between both the members of the lid 1 and the container body 2 is lower than the Vickers hardness of the contacted counter member within a range of 50 to 100 can be favorably used without decrease in the purity of the organotin compound. The product of Example 4 in which the difference in the Vickers hardness is smaller than 50 is estimated to cause no leakage but fastening failure.

Meanwhile, the product of Comparative Example 1, which has no difference in the Vickers hardness, is estimated to cause scratches on the member to be a problem. Comparative Example 2, which has the difference in the Vickers hardness of larger than 100, is also estimated to cause leakage due to deformation.

Example 5 and Comparative Example 3

As schematically illustrated in FIG. 2, a container constituted with the lid 1 and the container body 2, not the container to which the gasket is attached, is prepared. The container has a cyclic groove 7 for insertion of an O-ring into a flange part on the container body 2 side. An O-ring 8 to be interposed between the lid and the container body of the container is prepared. The O-ring 8 is hollow as illustrated in FIG. 2, and an inside of the hollow part is filled with nitrogen gas.

Metal materials of the above container (the lid 1 and the container body 2) and the O-ring 8 are selected from the metal materials shown in the Table 1. A container as shown in the following Table 4 is constituted (a bonding structure is constituted) by using these members, and incorporated into the semiconductor manufacturing line similarly to the aforementioned Examples 1 to 4 to be used for one month. A number of times of troubles of decrease in the purity of the organotin compound to less than 99.9%, such as corrosion, is estimated. The results are also shown in the following Table 4. A Vickers hardness of a portion to be disposed where the members are contacted with each other is also shown in Table 4.

TABLE 4

| | Material of lid and container body, and hardness (Vickers hardness P) of surface thereof | Material of O-ring 8 and hardness (Vickers hardness Q) of surface thereof | Difference in Vickers hardness (P-Q) | Estimated number of times of occurrence of corrosion |
|---|---|---|---|---|
| Example 5 | No. 5: SUS 316L (290) | No. 3: SUS 316L (200) | 90 | 0 |
| Comparative Example 3 | No. 3: SUS 316L (200) | No. 3: SUS 316L (200) | 0 | 6 |

As above, the product of Example 5 in which the Vickers hardness of the O-ring 8 interposed between both the members of the lid 1 and the container body 2 is not less than 50 lower than the Vickers hardness of the contacted counter member can be favorably used without decrease in the purity of the organotin compound. Since the inside of the O-ring 8 is filled with nitrogen gas, a countermeasure for breakage of the O-ring 8 is good. Meanwhile, the product of Comparative Example 3 in which the difference in the Vickers hardness is smaller than 50 (no difference) is estimated to cause troubles to be a problem such as contamination due to scratches and damage on the member by corrosion during the replacement.

INDUSTRIAL APPLICABILITY

According to the bonding structure of the present disclosure, the organotin compound can be contained or transferred in a state of keeping the high purity without impairing the quality of the organotin compound in a long term. Therefore, this bonding structure is useful for stably providing semiconductor products with excellent quality because the organotin compound with high quality can be stably handled. The configuration can yield the bonding structure suitable for containing or transferring the organotin compound requiring strict airtightness.

Obviously, numerous modifications and variations of the present invention are possible in light of the above teachings. It is therefore to be understood that within the scope of the appended claims, the invention may be practiced otherwise than as specifically described herein.

REFERENCE SIGNS LIST

1 LID
2 CONTAINER BODY
6 GASKET

The invention claimed is:

1. A container comprising a bonding structure, wherein the bonding structure comprises:

a first metal member;

a second metal member having a portion connected to the first metal member via a metal gasket or a metal O-ring, wherein the metal gasket or the metal O-ring has a contact surface having a Vickers hardness of from 150 to 200;

wherein a contact surface of the portion of the first and second metal members has a Vickers hardness of from 180 to 300;

wherein the Vickers hardness of the contact surface of the metal gasket or the metal O-ring is from 10 to 120 lower than the Vickers hardness of the contact surface of the portion of the first and second metal members, and wherein the container is filled with an organotin compound having formula (1):

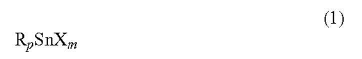

$$R_pSnX_m \quad (1)$$

wherein R is a hydrocarbon group, p is 0 or 1, X is a hydrolysable substituent, m is an integer of 1 to 4, and m+p is 2 or 4.

2. The container comprising a bonding structure according to claim 1, wherein the first metal member is a lid, and the Vickers hardness of the contact surface of the metal gasket or the metal O-ring is from 50 to 100 lower than the Vickers hardness of the contact surface of the portion of the metal member.

3. The container comprising a bonding structure according to claim 1, wherein the first metal member is a pipe for transfer, and the Vickers hardness of the contact surface of the metal gasket or the metal O-ring is from 10 to 100 lower than the Vickers hardness of the contact surface of the portion of the metal member.

4. The container comprising a bonding structure according to claim 1, wherein a contact surface of the metal gasket or the metal O-ring comprises stainless steel or a nickel alloy including at least 50 mass % of nickel.

5. The container comprising a bonding structure according to claim 1, wherein the metal gasket or the metal O-ring comprises SUS 316L.

6. The container comprising a bonding structure according to claim 1, wherein the metal gasket or the metal O-ring comprises a nickel alloy including iron, chromium, and at least 50 mass % of nickel.

7. The container comprising a bonding structure according to claim 1, wherein in the portion of the metal member, a surface layer within a predetermined depth has a higher hardness than an inner layer that is deeper than the surface layer by a surface-hardening treatment.

8. The container comprising a bonding structure according to claim 1, wherein all of the first metal member, the metal gasket or the metal O-ring, and the second metal member comprise a same metal material, wherein at least one of the metal gasket or metal O-ring, or the first metal member and the second metal member, is subjected to a hardness-changing treatment.

9. The container comprising a bonding structure according to claim 1, wherein the metal gasket or the metal O-ring is an O-ring having an inside filled with an inert gas.

10. The container comprising a bonding structure according to claim 1, wherein in formula (1), p is 1, and m is 3.

11. The container comprising a bonding structure according to claim 1, wherein the organotin compound has a purity of at least 99.9%.

12. A container, comprising a bonding structure, wherein the bonding structure comprises:

a first metal member;

a second metal member having a portion connected to the first metal member via a metal gasket or a metal O-ring, wherein the metal gasket or the metal O-ring has a contact surface having a Vickers hardness of from 150 to 200;

wherein a contact surface of the portion of the first and second metal members has a Vickers hardness of from 180 to 300; and wherein the Vickers hardness of the contact surface of the metal gasket or the metal O-ring is from 10 to 120 lower than the Vickers hardness of the contact surface of the portion of the first and second metal members.

13. The container according to claim 12, further comprising an organotin compound.

14. A method for transferring an organotin compound, the method comprising transferring the organotin compound using the container according to claim 12.

15. The method for transferring an organotin compound according to claim 14, wherein the organotin compound has a purity of at least 99.9%.

16. A method for transferring an organotin compound, the method comprising feeding the organotin compound from a manufacturing apparatus through a pipe to the container according to claim 12.

17. The method for transferring an organotin compound according to claim 16, wherein the organotin compound has a purity of at least 99.9%.

* * * * *